United States Patent
Sulkowski et al.

(10) Patent No.: US 11,591,830 B2
(45) Date of Patent: Feb. 28, 2023

(54) TWIST LOCK DESIGN FOR UNDERHOOD STRIKER PLATE

(71) Applicants: Michael W Sulkowski, Commerce Township, MI (US); Joseph A Casilio, Troy, MI (US)

(72) Inventors: Michael W Sulkowski, Commerce Township, MI (US); Joseph A Casilio, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 571 days.

(21) Appl. No.: 16/717,378

(22) Filed: Dec. 17, 2019

(65) Prior Publication Data

US 2020/0224467 A1    Jul. 16, 2020

Related U.S. Application Data

(60) Provisional application No. 62/790,690, filed on Jan. 10, 2019.

(51) Int. Cl.
| | |
|---|---|
| *E05B 85/04* | (2014.01) |
| *E05B 17/00* | (2006.01) |
| *E05B 83/24* | (2014.01) |
| *E05B 15/02* | (2006.01) |
| *B62D 25/12* | (2006.01) |

(52) U.S. Cl.
CPC .............. *E05B 85/04* (2013.01); *B62D 25/12* (2013.01); *E05B 17/0033* (2013.01); *E05B 83/243* (2013.01); *E05B 15/0205* (2013.01); *Y10T 292/68* (2015.04); *Y10T 292/683* (2015.04); *Y10T 292/696* (2015.04)

(58) Field of Classification Search
CPC .... E05B 85/04; E05B 17/0033; E05B 83/243; E05B 15/0205; B62D 25/12; Y10T 292/68; Y10T 292/683; Y10T 292/685; Y10T 292/688; Y10T 292/691; Y10T 292/694; Y10T 292/696; Y10T 292/699; Y10T 292/702; Y10T 292/705; Y10T 292/707; F16B 21/078
See application file for complete search history.

(56) References Cited

U.S. PATENT DOCUMENTS

| | | | | |
|---|---|---|---|---|
| 2,239,125 A | * | 4/1941 | Mills ...................... | F16B 5/10 29/512 |
| 2,753,610 A | * | 7/1956 | Miller .................... | F16B 5/0642 411/549 |
| 3,352,195 A | * | 11/1967 | Fisher ................... | F16B 37/043 24/453 |
| 3,504,875 A | * | 4/1970 | Gley ...................... | F16B 21/04 411/549 |

(Continued)

*Primary Examiner* — Christine M Mills
*Assistant Examiner* — Faria F Ahmad
(74) *Attorney, Agent, or Firm* — Ralph E. Smith

(57) ABSTRACT

A striker plate includes a base having a surface for contacting a switch and a wall. At least one support projects from the wall. The at least one support supports the base in a hood inner panel. At least one locking tab extends from the wall. The at least one locking tab engages a cutout on the panel. The support is positioned with respect to the respective locking tab so that the support engage the cutouts. Upon rotation of the base, the locking tab engages the cutout locking the base in place on the hood inner panel.

16 Claims, 4 Drawing Sheets

(56) References Cited

U.S. PATENT DOCUMENTS

| | | | | | |
|---|---|---|---|---|---|
| 3,842,709 | A | * | 10/1974 | Fuqua | F16B 21/086 248/27.3 |
| 4,580,322 | A | * | 4/1986 | Wright | F16B 21/078 24/663 |
| 5,011,355 | A | * | 4/1991 | Motoshige | F16B 21/078 411/552 |
| 5,294,226 | A | * | 3/1994 | Chow | F16B 21/078 411/338 |
| 5,368,427 | A | * | 11/1994 | Pfaffinger | F16B 21/04 24/DIG. 54 |
| 5,390,397 | A | * | 2/1995 | Kremer | F16B 21/073 24/351 |
| 7,207,758 | B2 | * | 4/2007 | Leon | F16B 21/02 411/45 |
| 9,267,525 | B2 | * | 2/2016 | Everard | F16B 21/02 |
| 10,124,742 | B2 | * | 11/2018 | Martinez | F16B 21/073 |
| 10,759,356 | B2 | * | 9/2020 | Lee | B60R 13/0237 |
| 2020/0088226 | A1 | * | 3/2020 | Dickinson | F16B 21/075 |
| 2020/0321729 | A1 | * | 10/2020 | Schlegel | H01R 13/6277 |

\* cited by examiner

TWIST LOCK DESIGN FOR UNDERHOOD STRIKER PLATE

CROSS-REFERENCE TO RELATED APPLICATION

This application claims the benefit of U.S. Provisional Application No. 62/790,690, filed on Jan. 10, 2019, the disclosure of which is incorporated herein by reference.

FIELD

The present disclosure relates to striker plates and, more particularly, to a twist lock design for an underhood striker plate.

BACKGROUND

Current underhood striker plate products do not have a built in locking feature. Current striker plates have a snap in only design. This requires a high insertion force to insert the striker plate into the vehicle hood inner panel. Some striker plates have additional fasteners to provide a locking feature. Similar striker plates with a locking feature consist of an assembly with multiple components.

Thus, designers strive to improve the art. Accordingly, it is desirable to have a striker plate that locks in place on the hood inner panel.

SUMMARY

The disclosure relates generally to a design for ease of manufacturing and ease of assembly complexity reduction.

The present disclosure overcomes the deficiencies of the prior art. The present disclosure provides a striker plate that is designed to be installed with a low installation force. The twist lock design can be inserted clockwise or counterclockwise into the hood inner panel. Additionally, the striker plate can be applied by a single hand of the installer. The design reduces complexity at the assembly plant. Further, it reduces the assembly time required to insert the striker plate into the hood inner panel.

According to a first aspect of the disclosure, a striker plate comprises a base with a surface to contact a switch. The base includes a surrounding wall. At least one first support projects from the wall. The at least one first support supports the base in an inner hood panel. At least one locking tab extends from the wall. The at least one locking tab engages a cutout on the hood inner panel. The first support is positioned, with respect to the respective locking tab, so that the first support engages the cutout. Upon rotation of the base, the locking tab engages the cutout locking the base in place on the hood inner panel. The at least one first support is spaced with respect to the at least one locking tab on the wall so that a gap is formed between them to receive the hood panel. At least one second support projects from the wall of the base. The panel is positioned between the first and second supports. The locking tab is cantilevered from the wall. The locking tab is deflectable with respect to the wall. The locking tab includes a crown portion to engage the cutout in the panel. The wall includes a portion surrounding the surface to engage the switch so as to define a cup shape.

According to a second aspect of the disclosure, a striker plate assembly comprises a panel including an aperture with at least one cutout. A striker plate is positioned in the aperture. The striker plate a striker plate comprises a base with a surface to contact a switch. The base includes a surrounding wall. At least one first support projects from the wall. The at least one first support supports the base in an inner hood panel. At least one locking tab extends from the wall. The at least one locking tab engages a cutout on the hood inner panel. The first support is positioned, with respect to the respective locking tab, so that the first support engages the cutout. Upon rotation of the base, the locking tab engages the cutout locking the base in place on the hood inner panel. The at least one first support is spaced with respect to the at least one locking tab on the wall so that a gap is formed between them to receive the hood panel. At least one second support projects from the wall of the base. The panel is positioned between the first and second supports. The locking tab is cantilevered from the wall. The locking tab is deflectable with respect to the wall. The locking tab includes a crown portion to engage the cutout in the panel. The wall includes a portion surrounding the surface to engage the switch so as to define a cup shape.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
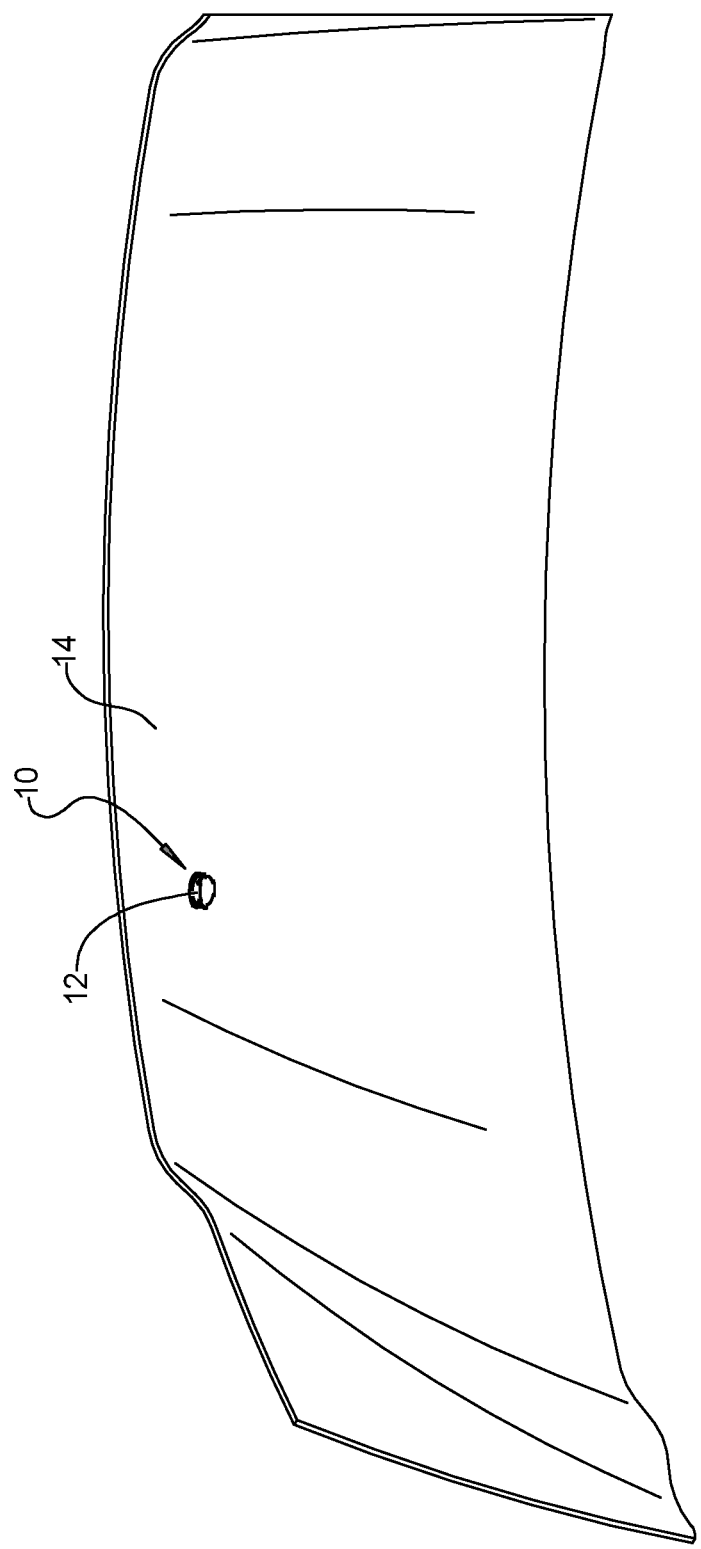
FIG. 1 is a perspective view of a vehicle hood inner panel with the present striker plate.
Figure 2:
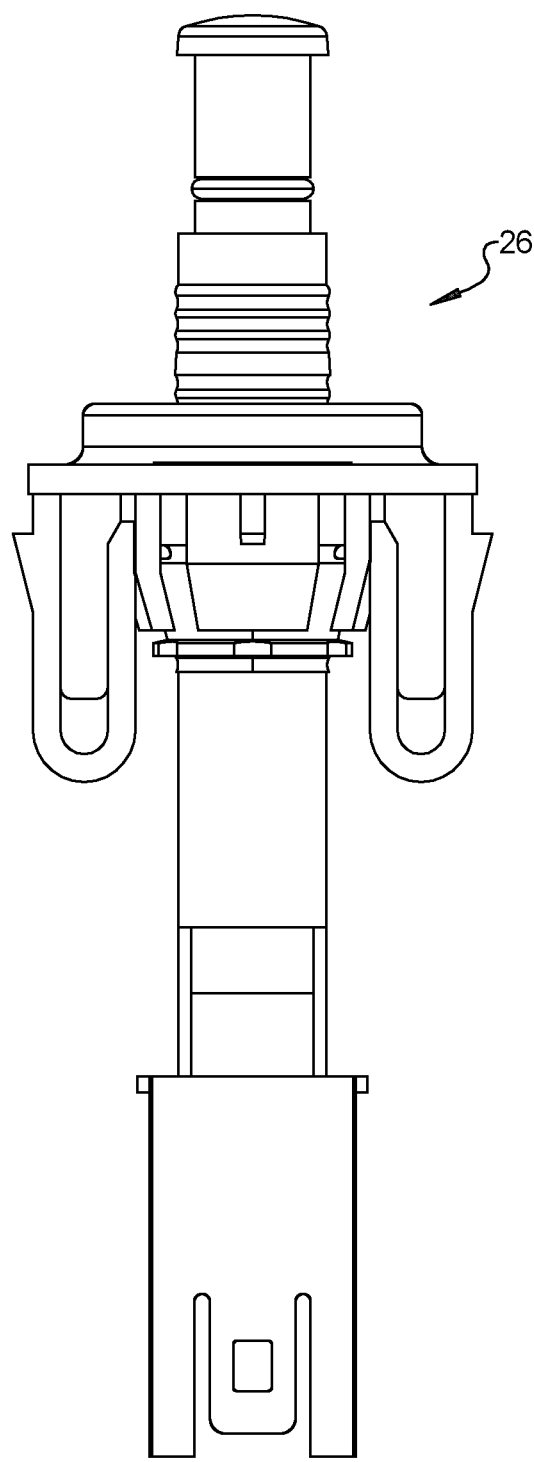
FIG. 2 is an elevation view of a switch contacted by the striker plate.
Figure 3:
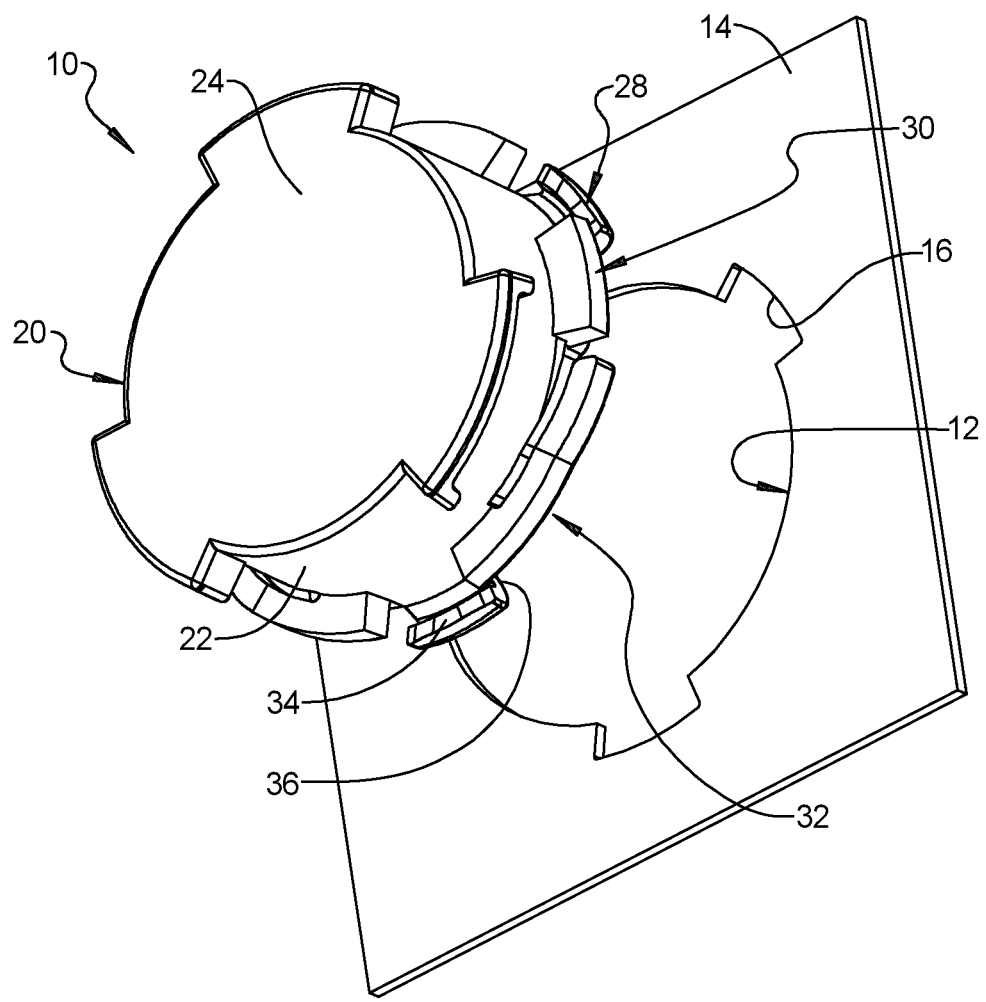
FIG. 3 is an enlarged perspective view of the striker plate assembly.

Turning to the figures, a striker plate is illustrated and designated with the reference numeral 10. The striker plate is inserted into an aperture 12 on a vehicle hood inner panel 14. The aperture 12 includes an overall circular design with one or more cutouts 16. The cutouts 16 have an overall rectangular design radiating outward from the circle.

The striker plate 10 includes a base 20 that includes a wall 22. The wall extends from the base 20 and surrounds a surface 24 to contact a switch 26. The surface 24 is generally planar with the cylindrical wall extending from the surface 24 to define an overall cup shape.

The wall 22 includes at least one and preferably a first plurality of supports 28. Also, it includes at least one and preferably a second plurality of supports 30. Further, it includes at least one and preferably a plurality of locking tabs 32.

The first supports 28 are positioned near an end of the wall 22. The first supports 28 have an overall rectangular design to fit into the cutouts 16. The striker plate 10 can be rotated clockwise or counterclockwise on the hood inner panel 14. The first supports 28 include an extending flange 34 projecting from a cantilevered portion 36 of the first supports. The flanges 34 extend away from the bottom of the wall 22 forming an L-shape. Thus, the first supports 28 can deflect with respect to the wall 22 so that the flange 34 provides a biasing force against the hood inner panel 14.

The second supports 30 are discrete and spaced from the first supports 28. Thus, a gap is formed between the first 28 and second 30 supports that receives the hood inner panel 14 when the striker plate 10 is rotated into position. The second supports have an overall rectangular shape and cantilever from the wall 22.

The locking tabs 32 project from the wall 22. The locking tabs 32 include a support portion 38 and a tab portion 40. The support portion 38 projects from the wall 22. The support portion 38 is aligned with the second supports 30 to provide additional support. The tab portion 40 extends from the support portion 38. It is thus cantilevered with respect to the support portion 38. Also, the tab portion 40 is angled downward towards the first support 28. Thus, the tab portion 40 acts as a spring.

The tab portion 40 deflects, axially with respect to the striker plate. Thus, the portion 40 moves to engage or disengage the cutouts 16. The tab portions 40 include a rounded crowned portion 42 that is positioned into the cutout 16 upon insertion of the tab portions 40 into the cutouts 16. Thus, by being cantilevered, tab portions 40 compress and deflect away from the hood inner panel 14. Also, as the tab portions 40 are aligned with the hood inner panel 14 cutouts 16, the tab portions 40 deflect to their original position to snap fit into the cutouts 16. The locking tab 32 is tapered to provide flexibility to the locking tab 32.

The striker plate 10 is inserted into the hood inner panel aperture 12. The first supports 28 are aligned with the cutouts 16. A force is applied to the striker plate 10. This compresses the locking tabs 32. As the first supports 29 are positioned below the inner surface of the hood inner panel, the striker plate 10 is rotated clockwise or counterclockwise. Once the striker plate 10 is inserted into the aperture 12, the second supports 30 rest on the outer surface of the hood inner panel 14. Thus, upon rotation, the hood inner panel 14 is positioned or sandwiched in the gap between the first 28 and second 30 supports. Additionally, the support portion 38 of the locking tabs 32 rests on the outer surface of the hood inner panel 14. Both the support portion 38 and second supports 30 provide support for the striker plate 10 to maintain it on the hood inner panel 14.

Figure 4:
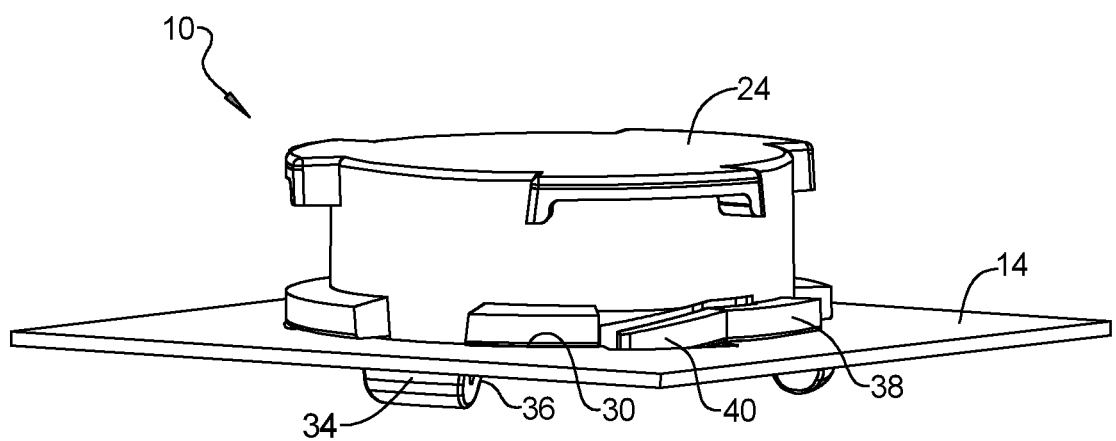
FIG. 4 is an enlarged perspective view of the striker plate on the vehicle inner panel.
Figure 5:
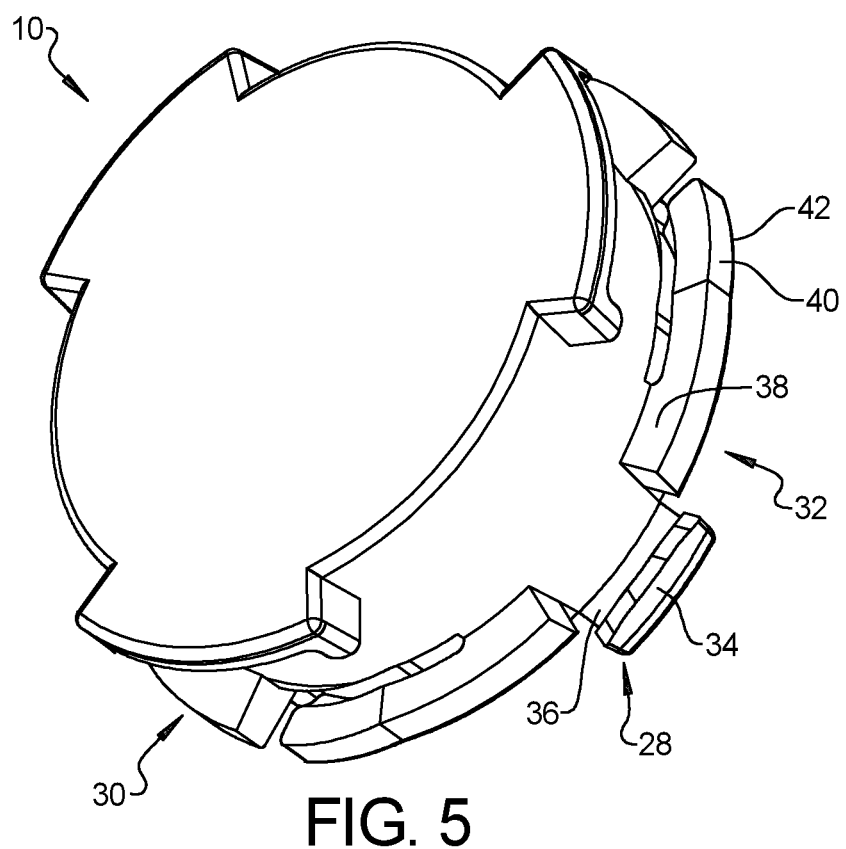
FIG. 5 is an enlarged perspective view of the striker plate.

The striker plate 10 is continued to be rotated. As the compressive force is released, the tab portion 40, via the crown portion 42, inserts into the cutouts 16 as illustrated in FIG. 4. Thus, the tab portion 40 is compressed towards the surface 24 as it rides along the outer surface of the hood inner panel 14. As the tab portion 40 engages the cutout 16, the compression force is removed and other portion 40 deflects away from the cup into the cutout 16 and return to their original molded position. Thus, the striker plate 10 is locked in position on the hood inner panel 14 via a rotating motion of the striker plate 10. Accordingly, the striker plate 10 can be removed by lifting, via a tool, one of the tab portions 40 out of the cutout 16. This enables rotation of the striker plate. Accordingly, upon alignment of the first supports with the cutouts 16, the striker plate 10 can be removed from the hood inner panel 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A striker plate comprising:
    a base having a wall and a surface, the surface being configured to contact a switch;
    at least one first support projecting from the wall, the at least one first support configured to support the base relative to a hood inner panel having an aperture formed therein that includes at least one cutout extending radially outward from the aperture;
    at least one second support projecting from the wall that is axially spaced apart from the at least one first support such that the hood inner panel is sandwiched between the at least one first support and the at least one second support;
    at least one locking tab extending from the wall, the at least one locking tab being configured to engage the at least one cutout on the hood inner panel; and
    the at least one first support is positioned with respect to the respective at least one locking tab so that the at least one first support engages the at least one cutout and upon rotation of the base the at least one locking tab engages the at least one cutout to lock the base in place on the hood inner panel.

2. The striker plate of claim 1, wherein the at least one first support is spaced with respect to the at least one locking tab on the wall so that a gap is formed between them to receive the hood inner panel.

3. The striker plate of claim 1, wherein the at least one locking tab is cantilevered from the wall.

4. The striker plate of claim 3, wherein the at least one locking tab is deflectable with respect to the wall.

5. The striker plate of claim 1, wherein the at least one locking tab includes a crowned portion.

6. The striker plate of claim 1, wherein the wall includes a portion surrounding the surface defining a cup.

7. The striker plate of claim 1, wherein the at least one first support being a plurality of first supports and the at least one locking tab being a plurality of locking tabs.

8. A hood assembly comprising:
    a hood inner panel including an aperture with at least one cutout portion extending radially outward from the aperture;
    a striker plate in the aperture, the striker plate comprising:
    a base having a wall and a surface for contacting a switch;
    at least one first support projecting from the wall, the at least one first support supports the base in the hood inner panel;
    at least one locking tab extending from the wall, the at least one locking tab for engaging the at least one cutout portion of the hood inner panel; and
    the at least one first support is positioned with respect to the respective at least one locking tab so that the at least one first support engages the at least one cutout portion and upon rotation of the base the at least one locking tab engages the at least one cutout portion to lock the base in place on the hood inner panel.

9. The striker plate of claim 8, wherein the at least one first support is spaced with respect to the at least one locking tab on the wall so that a gap is formed between them to receive the hood inner panel.

10. The striker plate of claim 8, further comprising at least one second support, the hood inner panel being positioned between the at least one first support and the at least one second support.

11. The striker plate of claim 10, wherein the at least one second supports projects from the wall.

12. The striker plate of claim 11, wherein the at least one locking tab is cantilevered from the wall.

13. The striker plate of claim 11, wherein the at least one locking tab is deflectable with respect to the wall.

14. The striker plate of claim 13, wherein the at least one locking tab includes a crowned portion.

15. The striker plate of claim 8, wherein the wall includes a portion surrounding the surface defining a cup.

16. The striker plate of claim 8, wherein the at least one first support being a plurality of first supports and the at least one locking tab being a plurality of locking tabs.

* * * * *